United States Patent
Ghazi Mansour et al.

(10) Patent No.: US 11,887,381 B2
(45) Date of Patent: Jan. 30, 2024

(54) USE OF HCNN TO PREDICT LANE LINES TYPES

(71) Applicant: NEW EAGLE, LLC, Ann Arbor, MI (US)

(72) Inventors: Iyad Faisal Ghazi Mansour, Auburn Hills, MI (US); Akhil Umat, Auburn Hills, MI (US)

(73) Assignee: New Eagle, LLC, Ann Arbor, MI (US)

( * ) Notice: Subject to any disclaimer, the term of this patent is extended or adjusted under 35 U.S.C. 154(b) by 275 days.

(21) Appl. No.: 17/245,038

(22) Filed: Apr. 30, 2021

(65) Prior Publication Data
US 2022/0350992 A1  Nov. 3, 2022

(51) Int. Cl.
| G06V 20/56 | (2022.01) |
| B60R 11/04 | (2006.01) |
| G06N 3/08 | (2023.01) |
| G06N 3/045 | (2023.01) |

(52) U.S. Cl.
CPC ............ *G06V 20/588* (2022.01); *B60R 11/04* (2013.01); *G06N 3/045* (2023.01); *G06N 3/08* (2013.01)

(58) Field of Classification Search
CPC ..... B60R 11/04; B60R 2300/00; G06N 3/045; G06N 3/08; G06V 10/82; G06V 20/588; G06V 10/00; G06V 20/00; G06V 30/00; G06V 40/00; G06V 2201/00; G06V 20/58; G06V 20/56; G06V 20/50
See application file for complete search history.

(56) References Cited

U.S. PATENT DOCUMENTS

| | | | | |
|---|---|---|---|---|
| 9,286,524 | B1* | 3/2016 | Mei | G06F 18/214 |
| 10,048,691 | B2* | 8/2018 | Reiff | G06V 20/588 |
| 2017/0076195 | A1* | 3/2017 | Yang | G06N 3/045 |
| 2017/0344808 | A1* | 11/2017 | El-Khamy | G06V 40/161 |
| 2018/0120859 | A1* | 5/2018 | Eagelberg | G05D 1/0246 |
| 2018/0162408 | A1* | 6/2018 | Stein | G06T 7/55 |
| 2019/0035101 | A1* | 1/2019 | Kwant | G06T 7/12 |
| 2019/0147253 | A1* | 5/2019 | Bai | G06F 18/2413 |
| | | | | 382/103 |
| 2019/0147254 | A1* | 5/2019 | Bai | G01S 17/89 |
| | | | | 382/104 |
| 2019/0147255 | A1* | 5/2019 | Homayounfar | G06N 3/08 |
| | | | | 701/23 |
| 2019/0278990 | A1* | 9/2019 | Mansour | G06T 7/10 |

OTHER PUBLICATIONS

Yan Tian, "Lane marking detection via deep convolutional neural network," Nov. 21, 2017, Neurocomputing 280 (2018), pp. 46-56.*

(Continued)

*Primary Examiner* — Omar S Ismail
(74) *Attorney, Agent, or Firm* — Vivacqua Crane PLLC

(57) ABSTRACT

A method of predicting lane line types utilizing a heterogeneous convolutional neural network (HCNN) includes capturing an input image with one or more optical sensors disposed on a host member, passing the input image through the HCNN, the HCNN having at least three distinct sub-networks, the three distinct sub-networks: predicting object locations in the input image with a first sub-network; predicting lane line locations in the input image with a second sub-network; and predicting lane line types for each predicted lane line in the input image with a third sub-network.

18 Claims, 5 Drawing Sheets

(56) References Cited

OTHER PUBLICATIONS

Essa Basaeed, "Supervised remote sensing image segmentation using boosted convolutional neural networks, "Feb. 27, 2016, Knowledge-Based Systems 99 (2016), pp. 19-23.*

Iyad Mansour, "A Proposed Heterogeneous Convolutional Neural Network for Embedded Automotive Vision Algorithms," Oct. 21, 2018, 2018 IEEE International Conference on Electro/Information Technology (EIT), pp. 0790-0794.*

* cited by examiner

| Lane Type Label | Lane Type | | Abbrevation |
|---|---|---|---|
| 0 | No Lane Line | | NL |
| 1 | Unknown Lane Line |  | UK |
| 2 | Dashed White |  | DW |
| 3 | Solid White |  | SW |
| 4 | Dashed Yellow |  | DY |
| 5 | Solid Yellow |  | SY |
| 6 | Dashed Yellow Solid Yellow |  | DYSY |
| 7 | Solid Yellow Dashed Yellow |  | SYDY |
| 8 | Double Solid Yellow |  | DSY |
| 9 | Emergency Lane Line |  | Eml |

USE OF HCNN TO PREDICT LANE LINES TYPES

FIELD

The present disclosure is directed to a system and method of using neural networks to predict the types of various lane lines on a road surface.

BRIEF DESCRIPTION

The statements in this section merely pr ovide background information related to the present disclosure and may or may not constitute prior art.

Vehicle technologies such as free-ranging on grid navigation, as well as parking guidance and information systems, aid in the prevention of human error when drivers operate a vehicle. Such technologies have been used to improve navigation of roadways, and to augment the parking abilities of vehicle drivers while the drivers are present within the vehicle. For example, on-board detection systems and impact alert systems have been developed that assist the operator of the vehicle while maneuvering to avoid collisions. Typical on-board detection systems utilize machine vision for determining or predicting the surroundings of the vehicle. The detection systems often rely upon cameras, and/or other optical sensors to predict lane lines, lane types, and in order to aid autonomous driving systems of the vehicle. More specifically, the detection systems provide data for autonomous driving systems to autonomously detect and avoid obstacles and avoiding collisions while driving. Some autonomous driving systems have even been adapted to autonomously park the vehicle in a parking spot once the operator of the vehicle has positioned the vehicle in a predefined location proximate the parking spot.

While these systems and methods are useful for their intended purpose, typical detection systems are subject to optical interference caused by weather, debris, and the like. Accordingly, there is a need in the art for new and improved vehicle technologies that are robust in predicting both lane lines and lane types even when the road surface is obscured by weather, debris, and the like.

SUMMARY

According to several aspects of the present disclosure a method of predicting lane line types utilizing a heterogeneous convolutional neural network (HCNN) includes capturing an input image with one or more optical sensors disposed on a host member. The method further includes passing the input image through the HCNN, the HCNN having at least three distinct sub-networks, the three distinct sub-networks. The HCNN predicts object locations in the input image with a first sub-network and predicts lane line locations in the input image with a second sub-network. The HCNN also predicts lane line types for each predicted lane line in the input image with a third sub-network.

In another aspect of the present disclosure passing the input image through the HCNN further includes directly receiving the input image in a feature extraction layer (FEL) portion of the HCNN. The HCNN has multiple convolution, pooling and activation layers stacked together with each other. Within the FEL portion, a learning operation is conducted to cause the HCNN to learn to represent at least a first stage of data of the input image in a form including horizontal and vertical lines and simple blobs of colors. The HCNN outputs the first stage of data to at least: the first sub-network, the second sub-network, and the third sub-network. The first sub-network directly receives the first stage of data from the FEL portion and the performs a first task of object detection, classification, and localization for classes of objects in the input image to create a detected object table. The second sub-network directly receives the first stage of data from the FEL portion and performs a second task of lane line detection to create a lane line location table. The third sub-network directly receives the first stage of data from the FEL portion and performs a third task of lane line type detection to create a lane line type table.

In another aspect of the present disclosure the method further includes receiving the first stage of data within a first convolution and pooling (CPL) portion of the FEL and receiving the second stage of data capturing shapes including at least circles, rectangles, and triangles. The second stage of data is forwarded to the first sub-network for performing the first task of object detection, classification, and localization for classes of objects in the input image to create the detected object table.

In another aspect of the present disclosure the method further includes capturing a third stage of data within a second CPL portion. The third stage of data defines complex geometries including combinations of the first stage of data and the second stage of data and complex feature combinations to form a representation including wheels, faces and grids. The third stage of data is forwarded from the second CPL portion to the first sub-network for performing the first task of object detection, classification, and localization for classes of objects in the input image to augment the detected object table.

In another aspect of the present disclosure the method further includes receiving the first stage of data within the second CPL portion of the FEL and receiving the second stage of data capturing shapes including at least lines, circles, rectangles, and triangles. The second stage of data is forwarded to the second sub-network for performing the second task of lane line detection and localization for classes of lane lines in the input image to create the lane line location table.

In another aspect of the present disclosure the method further includes capturing the third stage of data within the second CPL portion, the third stage of data defining complex geometries including combinations of the first stage of data and the second stage of data and complex feature combinations to form a representation including lane lines. The third stage of data is forwarded from the second CPL portion to the second sub-network for performing the second task of lane line detection and localization for classes of lane lines in the input image to create the lane line location table.

In another aspect of the present disclosure the method further includes receiving the first stage of data within a third CPL portion of the FEL and receiving the second stage of data capturing shapes including at least lines circles, rectangles, and triangles. The second stage of data is forwarded to a third sub-network for performing the third task of lane line type detection for classes of lane lines types in the input image to create a detected lane line type table.

In another aspect of the present disclosure the method further includes capturing the third stage of data within the third CPL portion, the third stage of data defining complex geometries including combinations of the first stage of data and the second stage of data and complex feature combinations to form a representation including lane lines. The third stage of data is forwarded from the second CPL portion to the third sub-network for performing the third task of lane line type detection for classes of lane lines types in the input image and creating a detected lane line type table.

In another aspect of the present disclosure creating a detected lane line type table further includes predicting ten values for each lane line in the input image and extracting values for each lane line in the input image. Creating the detected lane line type table further includes extracting a maximum value for each lane line and extracting a lane line label corresponding to the maximum value.

In another aspect of the present disclosure the method further includes training the first sub-network by decreasing a value of a loss function of the first sub-network from a first value to a second value smaller than the first value, the loss function decreasing while freezing the second sub-network and the third sub-network. The second sub-network is trained by decreasing a value of a loss function of the second sub-network from a first value to a second value smaller than the first value while freezing the first sub-network and the third sub-network. The third subnetwork is trained by decreasing a value of a loss function of the third sub-network from a first value to a second value smaller than the first value while freezing the first sub-network and the second sub-network.

In another aspect of the present disclosure a system for predicting lane line types utilizing a heterogeneous convolutional neural network (HCNN) includes one or more optical sensors disposed on a host member, the one or more optical sensors capturing an input image. The system further includes an HCNN having at least three distinct sub-networks, the three distinct sub-networks being: a first sub-network predicting object locations in the input image, a second sub-network predicting lane line locations in the input image, and a third sub-network predicting lane line types for each predicted lane line in the input image. The HCNN receives the input image and passes the input image through the three distinct sub-networks.

In another aspect of the present disclosure when the HCNN passes the input image through the three distinct sub-networks, the input image is directly received in a feature extraction layer (FEL) portion of the HCNN. The HCNN has multiple convolution, pooling and activation layers stacked together with each other. The FEL portion conducts a learning operation to learn to represent at least a first stage of data of the input image in a form including horizontal and vertical lines and simple blobs of colors. The FEL portion outputs the first stage of data to at least: the first sub-network, the second sub-network, and the third sub-network. The first sub-network directly receives the data from the FEL portion and performs a first task of object detection, classification, and localization for classes of objects in the input image to create a detected object table. The second sub-network directly receives the data from the FEL portion and performs a second task of lane line detection to create a lane line location table. The third sub-network directly receives the data from the FEL portion and performs a third task of lane line type detection to create a lane line type table.

In another aspect of the present disclosure the first stage of data is received within a first convolution and pooling (CPL) portion of the FEL. A second stage of data capturing shapes including at least circles, rectangles, and triangles is received within a first CPL portion of the FEL. The second stage of data is forwarded to the first sub-network. The first sub-network performs the first task of object detection, classification, and localization for classes of objects in the input image to create the detected object table.

In another aspect of the present disclosure a third stage of data is captured within a second CPL portion, the third stage of data defines complex geometries including combinations of the first stage of data and the second stage of data and complex feature combinations to form a representation including wheels, faces and grids. The second CPL forwards the third stage of data to the first sub-network. The first sub-network performs the first task of object detection, classification, and localization for classes of objects in the input image to augment the detected object table.

In another aspect of the present disclosure the first stage of data is received within the second CPL portion of the FEL. The second stage of data is received within the second CPL portion of the FEL, the second stage of data capturing shapes including at least lines, circles, rectangles, and triangles. The second stage of data is forwarded to the second sub-network. The second sub-network performs the second task of lane line detection and localization for classes of lane lines in the input image to create the lane line location table.

In another aspect of the present disclosure the third stage of data is captured within the second CPL portion, the third stage of data defining complex geometries including combinations of the first stage of data and the second stage of data and complex feature combinations to form a representation including lane lines. The third stage of data is forwarded from the second CPL portion to the second sub-network. The second sub-network performs the second task of lane line detection and localization for classes of lane lines in the input image to create the lane line location table.

In another aspect of the present disclosure the first stage of data is received within a third CPL portion of the FEL. The second stage of data is received within the third CPL portion of the FEL, the second stage of data capturing shapes including at least lines circles, rectangles, and triangles. The second stage of data is forwarded to a third sub-network. The third sub-network performs the third task of lane line type detection for classes of lane lines types in the input image to create a detected lane line type table.

In another aspect of the present disclosure the third stage of data is captured within the third CPL portion, the third stage of data defining complex geometries including combinations of the first stage of data and the second stage of data and complex feature combinations to form a representation including lane lines. The third stage of data is forwarded from the third CPL portion to the third sub-network. The third sub-network performs the third task of lane line type detection for classes of lane lines types in the input image and creating a detected lane line type table.

In another aspect of the present disclosure the third CPL portion creates a detected lane line type table by: predicting ten values for each lane line in the input image, extracting values for each lane line in the input image, extracting a maximum value for each lane line, extracting a lane line label from the detected lane line type table corresponding to the maximum value. The CPL portion trains the first sub-network by decreasing a loss function of the first sub-network from a first value to a second value smaller than the first value while freezing the second sub-network and the third sub-network. The CPL portion trains the second sub-network by decreasing a loss function of the second sub-network from a first value to a second value smaller than the first value while freezing the first sub-network and the third sub-network. The CPL portion trains the third sub-network by decreasing a loss function of the third sub-network from a first value to a second value smaller than the first value while freezing the first sub-network and the second sub-network.

In another aspect of the present disclosure a method of predicting lane line types utilizing a heterogeneous convolutional neural network (HCNN) includes capturing an input image with one or more optical sensors disposed on a host member. The method further includes passing the input image through four shared convolution and pooling convolutional layer portions (CPLs) within the HCNN, the HCNN having at least three distinct sub-networks, and passing an output of the four shared convolutional layers through the at least three fully connected layers. The method trains a first sub-network by decreasing a loss function of the first sub-network from a first value to a second value smaller than the first value while freezing the second sub-network and the third sub-network. The method trains a second sub-network by decreasing a loss function of the second sub-network from a first value to a second value smaller than the first value while freezing the first sub-network and the third sub-network. The method trains a third sub-network by decreasing a loss function of the third sub-network from a first value to a second value smaller than the first value while freezing the first sub-network and the second sub-network. The first sub-network performs a first task of object detection, classification, and localization for classes of objects in the input image to create a detected object table, the second sub-network performs a second task of lane line detection and localization for classes of lane lines in the input image to create a lane line location table, and the third sub-network performs a third task of lane line type detection for classes of lane lines types in the input image and creates a detected lane line type table.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application or uses.

Figure 1:
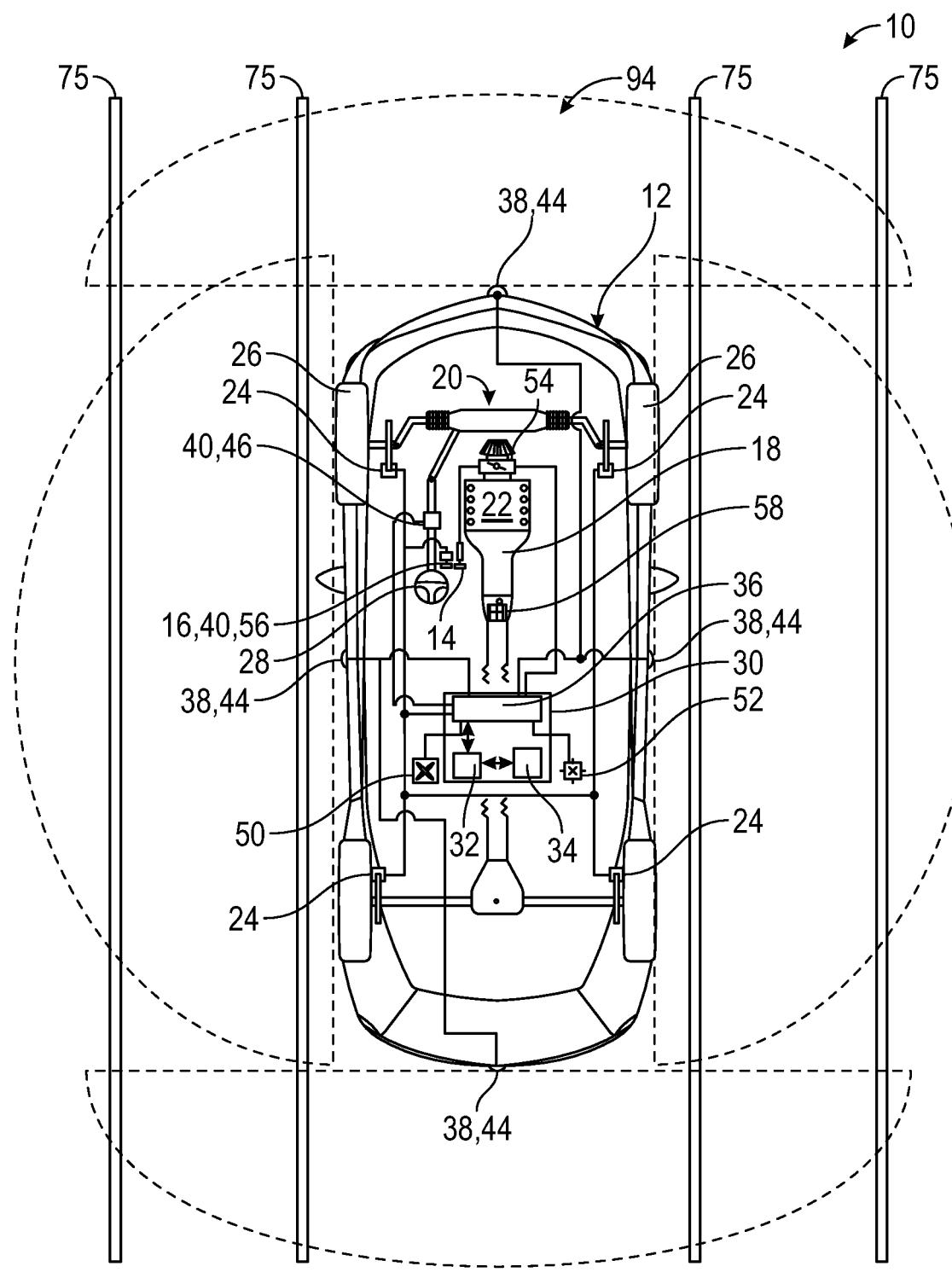
FIG. 1 is a schematic illustration of a vehicle using a heterogeneous convolutional neural network (HCNN) system to predict lane line types proximate to the vehicle according to an embodiment of the present disclosure.

With reference to FIG. 1, a system for predicting lane lines and lane types through neural networks according to the principles of the present disclosure is shown and indicated generally by reference number 10. The system 10 operates on a vehicle 12. The vehicle 12 is illustrated as a passenger vehicle, however the vehicle 12 may be a truck, sport utility vehicle, van, motor home, or any other type of road vehicle, water vehicle, or air vehicle without departing from the scope or intent of the present disclosure. The vehicle 12 is equipped with one or more of a throttle system 14, a braking system 16, a transmission system 18, and a steering system 20. A vehicle operator uses the throttle system 14 to control a rate of acceleration of the vehicle 12. In several aspects, the throttle system 14 controls a torque output of propulsion devices 22 that motivate the vehicle 12. The propulsion devices 22 may take any of a variety of different forms, depending on the vehicle 12 type. In some examples, the propulsion devices 22 may include electric motors or motivators, internal combustion engines, pneumatic or hydraulic motivators, or any other sort of prime mover.

The braking system 16 controls a rate of deceleration of the vehicle 12. In examples, the braking system 16 may operate or control a quantity of braking pressure applied to the disc or drum brakes 24 of an exemplary vehicle 12. The transmission system 18 controls directional movement of the vehicle 12. In some examples, the transmission may be a geared transmission such as a manual transmission, a dual clutch transmission, a continuously variable transmission, an automatic transmission, any combination of these transmission types, or the like. Similarly, the transmission system 18 may control a direction of rotation of electric motors or motivators disposed in and providing propulsion to the vehicle 12. The steering system 20 controls a yaw rate of the vehicle 12 and may include steerable wheels 26, in combination with a steering apparatus such as a steering wheel 28, a tiller or any of a variety of hydrodynamic control surfaces providing yaw control to a watercraft, or any of a variety of aeronautical control surfaces providing yaw control to an aircraft.

The vehicle 12 is equipped with one or more control modules 30. Each control module 30 is a non-generalized electronic control device having a preprogrammed digital computer or processor 32, memory or non-transitory computer readable medium 34 used to store data such as control logic, instructions, image data, lookup tables, and the like, and a plurality of input/output (I/O) peripherals or ports 36. The processor 32 is configured to execute the control logic or instructions. The control logic or instructions include any type of computer executable program code, including source code, object code, and executable code. The control logic also includes software programs configured to perform a specific function or set of functions. The control logic may include one or more computer programs, software components, sets of instructions, procedures, functions, objects, classes, instances, related data, or a portion thereof adapted for implementation in a suitable computer readable program code. The control logic may be stored within the memory 34 or in additional or separate memory.

The control modules 30 may have additional processors 32 or additional integrated circuits in communication with the processors 32, such as perception logic circuits for analyzing visual data, or dedicated vehicle-to-vehicle (V2V) or vehicle-to-infrastructure (V2I) circuits. Alternatively, the functions of the control module 30 may be distributed across a variety of sub-systems. The memory 34 includes media where data can be permanently stored and/or media where data can be stored and later overwritten, such as a rewritable optical disc or erasable memory device. In further examples, the memory 34 may include any of a variety of different storage media, such as flash memory, an embedded multimedia card (EMMC) flash memory, a random access memory (RAM), or the like. The I/O ports 36 receive input data from one or more sensors 38 and actuators 40 of the vehicle 12.

The sensors 38 include an optical sensing system 42 having sensors such as cameras 44, ultrasonic sensors, light detection and ranging (LiDAR) units 46, and radio detection and ranging (RADAR) units 48. The sensors 38 of the optical sensing system 42 are shown in four distinct locations in FIG. 1, however, it should be appreciated that the sensors 38 may be located at any of a variety of other locations on or off the vehicle 12 without departing from the scope or intent of the present disclosure. The sensors 38 also include movement sensors such as gyroscopic sensors 50, accelerometers 52, and the like. The actuators 40 should be understood to include any of a variety of electronic, hydraulic, and pneumatic devices capable of altering the movement of the vehicle 12. In some examples, the actuators 40 include a throttle actuator 54 of the throttle system 14 operable to alter a quantity of torque generated by the propulsion device 22 of the vehicle 12. In another example, the actuators 40 include a brake actuator 56 of the braking system 16. The brake actuator 56 is operable to alter a quantity of deceleration applied by the braking system 16 of the vehicle 12. In further examples, the actuators 40 include a transmission ratio selector 58 of the transmission system 18, and a steering actuator 60 of the steering system 20. The transmission ratio selector 58 is operable to alter a direction and/or rate of motion of the vehicle 12. The steering actuator 60 adjusts a yaw rate of the vehicle 12.

The control module 30 communicates electronically, pneumatically, hydraulically, or the like, with a variety of on-board systems, such as the throttle system 14, the braking system 16, the transmission system 18, and the steering system 20. The control module 30 of the system 10 collects and analyzes optical information collected by the vehicle 12 about the vehicle's 12 surroundings. In particular, the system 10 collects or captures optical information in the form of an input image 61 from one or more optical sensors 38 such as cameras 44. The cameras 44 are disposed on a host member such as the vehicle 12.

Figure 2:
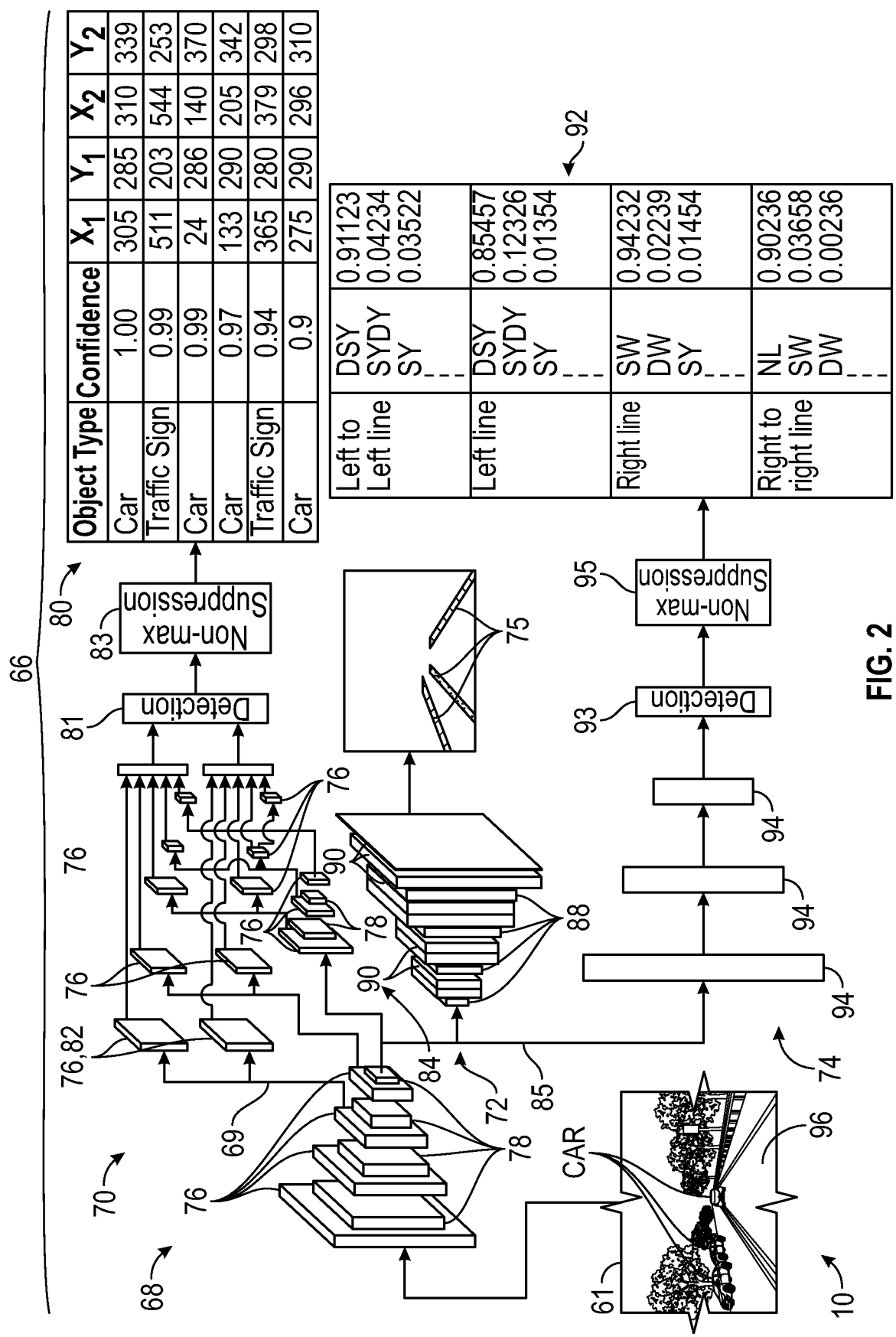
FIG. 2 is an illustration of the HCNN system of FIG. 1, including a three sub-networks, each of the sub-networks performing distinct image processing functions from the other sub-networks according to an embodiment of the present disclosure.

Turning now to FIG. 2, and with continuing reference to FIG. 1, the system 10 then utilizes a heterogeneous convolutional neural network (HCNN) 66 to analyze the optical information and to train itself to recognize features within the optical information in the input image 61. The HCNN 66 is a computer executable program code or software stored in the memory 34 and executed by the processor 32 of the control module 30. Specifically, the HCNN 66 includes a feature extraction layer (FEL) portion 68 as well as at least three distinct sub-networks, each performing a different task. The three distinct sub-networks include: a first sub-network 70, a second sub-network 72, and a third sub-network 74 which will be described in further detail below. The FEL portion 68 captures objects in the input image 61 and then in each of the first, second and third sub-networks 70, 72, 74 predicts the objects, lane lines 75, and lane line types in the input image 61.

More specifically, the FEL portion 68 includes multiple convolution and activation layers 76, stacked together with pooling layers 78. Each convolution and activation layer 76 is stacked together with a pooling layer 78. The FEL portion 68 receives the input image 61 directly from the cameras 44 on the host member or vehicle 12. The FEL portion 68 carries out a plurality of operations to refine the input image 61 into usable data.

The FEL portion 68 conducts a learning operation to learn to represent at least a first stage of data 69 of the input image 61 in a form including horizontal and vertical lines, as well as simple blobs of color. The horizontal and vertical lines represent horizontal and vertical components of objects or road markings in the input image 61. In FIG. 2, the output of the first stage of data 69 defines the coordinates of objects, lane lines 75, and the like in the input image 61. Specifically, in table 80, columns X1, Y1, X2, and Y2 define top left, top right, bottom left and bottom right coordinates, respectively of the objects or road markings in the input image 61. That is, X1 defines a position of the top left coordinate of an object, road marking, or the like. Y1 defines a position of the top right coordinate of each object, road marking, or the like. Similarly, X2 and Y2 define the bottom left and bottom right coordinates of each object, road marking, or the like in the input image 61. The simple blobs of color are defined by clusters of dots which approximate the size and shape of objects within the input image 61 received by the FEL portion 68. The FEL portion 68 outputs the first stage of data 69 to at least the first sub-network, the second sub-network, and the third sub-network.

The first sub-network 70 directly receives the first stage of data 69 from the FEL portion 68 and analyzes the first stage of data 69 to create a detected object table 80. The first sub-network 70 analyzes the first stage of data 69 to perform object detection, object classification, and object localization for classes of objects within the input image 61. Specifically, the first stage of data 69 is received by a first convolution and pooling (CPL) portion 82 of the FEL 68. The first CPL portion 82 captures or detects 81 shapes including at least circles, rectangles, and triangles within the input image 61, which are then used to create the detected object table 80. The shapes detected 81 in the input image 61 are then extracted. A confidence level or value is assigned to each object detected within the input image 61. Specifically, non-maximum values or confidence levels are suppressed 83 so that a maximum value or maximum confidence value is extracted for each object detected within the input image 61.

The first stage of data 69 is capable of capturing small objects, i.e. objects smaller than a human, a pet, or the like, in the input image 61. It should be appreciated that while specific shapes have been listed above, these shapes are non-limiting. Any of a variety of different shapes may be detected without departing from the scope or intent of the present disclosure. The results of the object detection, classification, and localization analysis are outputted as a second stage of data 83. The second stage of data 83 is forwarded to the first sub-network 70 to generate the detected object table and stored in memory 34. In the exemplary detected object table 80, several types of objects are indicated in the left-most column, including: car, traffic sign, and the like. It should be appreciated that the detected object table 80 may include any of a variety of detected objects including those listed, as well as pedestrians, other types of motor vehicles, trees, railings and/or fences, bollards, road hazards, and the like without departing from the scope or intent of the present disclosure.

A second CPL portion 84 of the FEL portion 68 captures a third stage of data 85. The third stage of data 85 defines complex geometries within the input images 61. In some aspects, the complex geometries are formed of combinations of the first stage of data 69 and the second stage of data 83. Additionally, the complex geometries define complex features or feature combinations detected within the input image 61. In some examples, the complex features are: wheels, faces, and grids, or the like. In some aspects, the wheels are automobile, motorcycle, or bicycle wheels, the faces are curbs, signs, and the like, or human faces, or animal silhouettes. The third stage of data 85 is then forwarded from the second CPL portion 84 to the first sub-network 70 where the first sub-network utilizes the third stage of data 85 to perform object detection, classification, and localization and augment the detected object table. In addition, the second CPL portion 84 forwards the third stage of data 85 to the second sub-network 72 for performing the task of lane line 75 detection and localization and to create a lane line location table 87.

More specifically, the second CPL portion 84 receives the first and the second stages of data 69, 83. The second stage of data 83 captures shapes including at least lines, circles, rectangles, and triangles. The second stage of data 83 is forwarded to the second sub-network 72. The second-sub-network 72 passes the first and second stages of data 69, 83 through a series of up-sampling layers 88 and deconvolution layers 90. Each up-sampling layer 88 is paired with at least one deconvolution layer 90. As the first and second stages of data 69, 83 are processed through the up-sampling and deconvolution layers 88, 90, the second sub-network 72 performs the task of lane line 75 detection and localization for classes of lane lines 75 in the input image 61. The lane line 75 detection and localization for classes of lane lines 75 are used to generate the lane line location table 87.

A third CPL portion 86 within the FEL portion 68 receives the first stage of data 69 and the second stage of data 83, including at least lines, circles, rectangles, and triangles. The third CPL portion 86 forwards the second stage of data 83 to the third sub-network 74 to perform the task of lane line 75 type detection for classes of lane line 75 types in the input image 61, and to create a detected lane line type table 92. More specifically, the third CPL portion 86 passes the third stage of data 85 through at least three fully connected layers 94 of the HCNN 66, in which the third CPL portion 86 defines complex geometries including combinations of the first and second stages of data 69, 83 and complex feature combinations. In some examples, the complex feature combinations form representations of lane lines 75 and the like. Additionally, the second CPL portion 84 forwards the third stage of data 85 from to the third sub-network 74 to perform the task of lane line 75 type detection for classes of lane line 75 types in the input image 61, and to create the detected lane line type table 92.

The detected lane line type table 92 is generated by an algorithm or computer executable program code stored within the memory 34 and executed by the processor 32 that predicts at least ten values for each lane line 75 detected within the input image 61. A confidence level or value is assigned to each of the ten values for each lane line 75 within the input image 61. The values for each lane line 75 detected 93 in the input image 61 are then extracted. Specifically, non-maximum values or confidence levels are suppressed 95 so that a maximum value or maximum confidence value is extracted for each lane line 75 detected within the input image 61. Each of the ten values corresponds to a particular lane line 75 type.

Figure 3:
FIG. 3 is a table depicting a plurality of possible lane line type outputs of the HCNN system according to an embodiment of the present disclosure.
Figure 3:
Figure 3:
Figure 3:
Figure 3:
Figure 3:
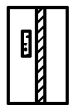
Figure 3:
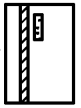
Figure 3:
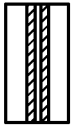
Figure 3:

Turning now to FIG. 3, and with continuing reference to FIGS. 1-2, a table of exemplary lane line 75 types is shown in further detail. In the example of FIG. 3, a zero (0) value corresponds to a nonexistent lane line (NL). An unknown (Unk) lane line corresponds to a one (1) value. A dashed white line (DW) corresponds to a two (2) value. A solid white line (SW) corresponds to a three (3) value. A Dashed yellow line (DY) corresponds to a four (4) value. A solid yellow line (SY) corresponds to a five (5) value. A dashed yellow solid yellow line (DYSY) corresponds to a six (6) value. A solid yellow dashed yellow line (SYDY) corresponds to a seven (7) value. A double solid yellow line (DSY) corresponds to an eight (8) value, and an emergency lane line (Eml) corresponds to a nine (9) value. The maximum value extracted for each lane line 75 detected in the input image 61 is then outputted or extracted to the detected lane line type table 92.

The first sub-network 70 is further trained by minimizing a loss function of the first sub-network 70 while freezing the second sub-network 72 and the third sub-network 74. Likewise, the second sub-network 72 is trained by minimizing a loss function of the second sub-network 72 while freezing the first and the third sub-networks 70, 74. Similarly, the third sub-network 74 is trained by minimizing a loss function of the third sub-network 74 while freezing the first and second sub-networks 70, 72. The term "minimizing" means decreasing as close to zero as possible. Accordingly with respect to the above-discussed loss functions, minimizing the loss functions is intended to impart the concept that the loss functions are decreased as close to zero so that the loss functions have as small an effect on the sub-networks 70, 72, 74 as possible during training of each of the sub-networks 70, 72, 74.

Figure 4A:
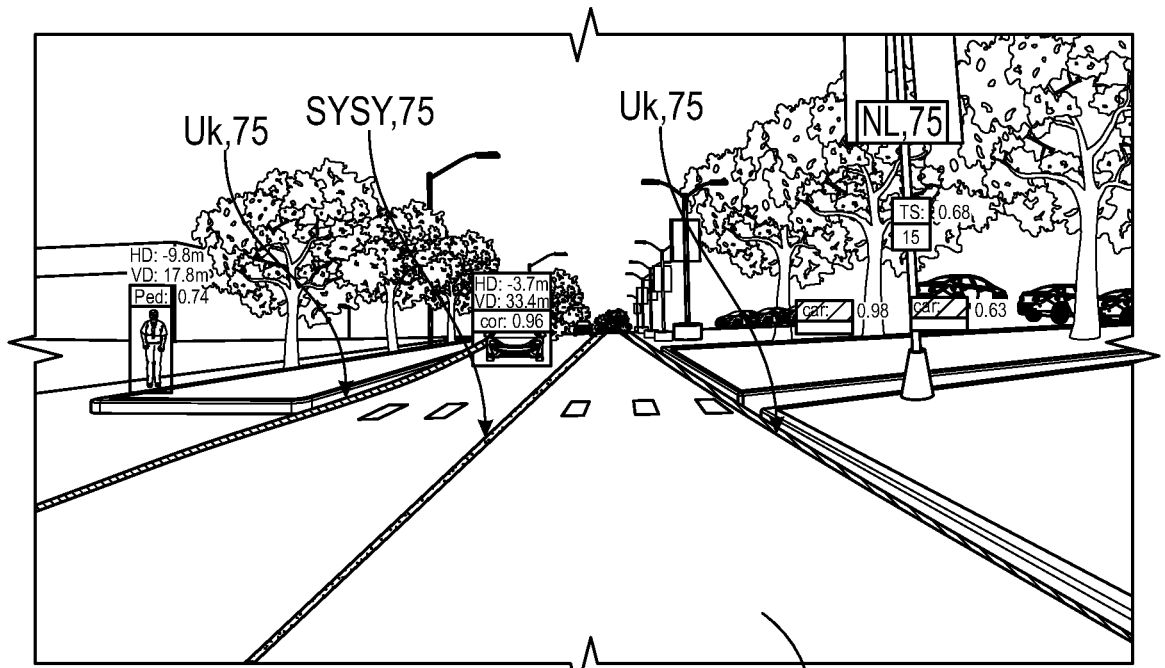
FIG. 4A is an illustration of an output of the HCNN system of FIGS. 1-3 overlaid onto a daytime image of an exemplary road surface according to an embodiment of the present disclosure.
Figure 4B:
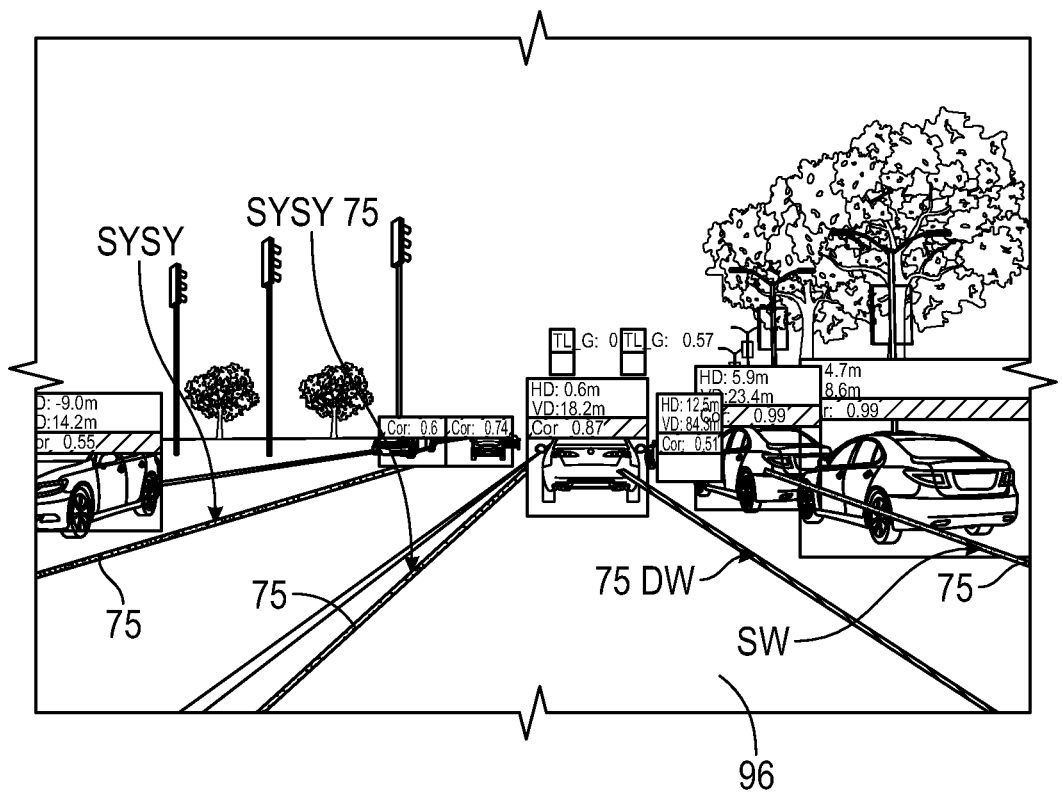
FIG. 4B is an illustration of an output of the HCNN system of FIGS. 1-3 overlaid onto a nighttime image of an exemplary road surface according to an embodiment of the present disclosure.

Turning now to FIGS. 4A and 4B, and with continuing reference to FIGS. 1-3, two examples of outputs of the system 10 are shown in further detail. Specifically, FIG. 4A depicts an overlay of system 10 outputs on a daytime image of a road surface 96 including lane lines 75 (Uk, SYSY, Uk, NL), and objects [e.g. a pedestrian (Ped), several cars (car), and trees (Ts)] within the field of view of the sensors 38 equipped to an exemplary vehicle 12. Similarly, FIG. 4B depicts an overlay of system 10 outputs on a nighttime image of a road surface 96 including lane lines 75 (SYSY, SYSY, DW, SW), and cars (car) within the field of view of the sensors 38 of the exemplary vehicle 12. Thus, utilizing the equipment and procedure described hereinabove, the HCNN 66 predicts object locations in the input image 61 with the first sub-network 70, predicts lane line 75 locations in the input image 61 with the second sub-network 72, and predicts lane line 75 types for each predicted lane line 75 in the input image 61 with the third sub-network 74.

Figure 5:
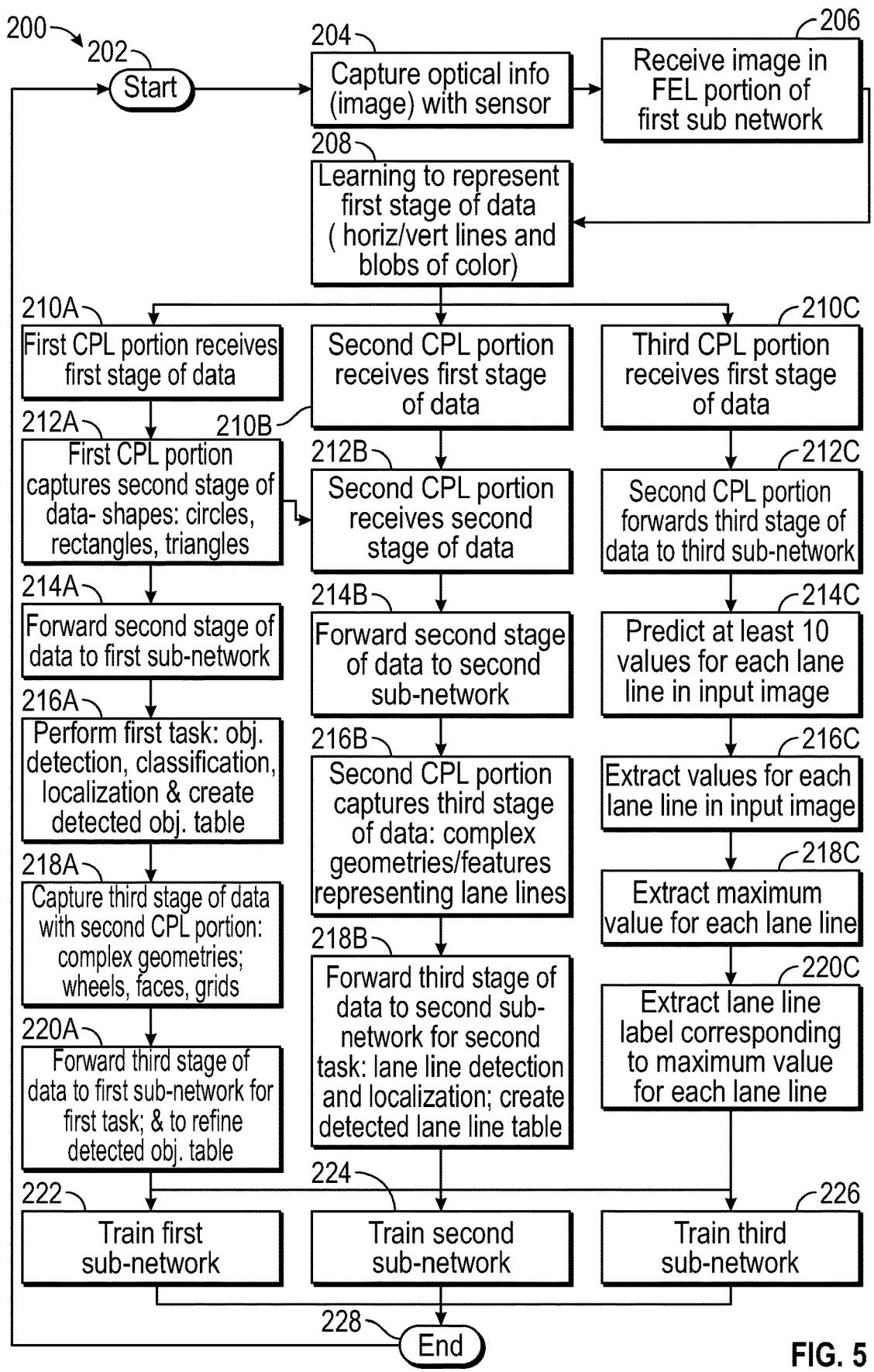
FIG. 5 is a flow chart of a method for predicting lane line types utilizing an HCNN system according to an embodiment of the present disclosure.

Turning now to FIG. 5, a method for predicting lane line 75 types utilizing an HCNN 66 is shown and indicated generally by reference number 200. The method 200 begins at block 202. At block 204 one or more optical sensors 38 disposed on a host member or vehicle 12 captures an input image 61. At block 206 the input image 61 is passed to the three distinct sub-networks 70, 72, 74, respectively, of the HCNN 66.

Specifically, at block 206, the input image 61 is passed to the first sub-network 70, where the input image 61 is received in the FEL portion 68 of the HCNN 66. At block 208, the FEL portion 68 conducts a learning operation to represent at least a first stage of data 69 in the input image 61 in a form including horizontal and vertical lines, and simple blobs of color. The FEL portion 68 outputs the first stage of data 69 to the first, second, and third sub-networks 70, 72, 74.

At block 210A, the first stage of data 69 is received directly from the FEL portion 68 by the first sub-network 70. At blocks 210A through 218A, the first sub-network 70 performs the first task of object detection, classification, and localization for classes of objects in the input image 61.

More specifically, at block 210A, the first sub-network 70 receives the first stage of data 69 within the first CPL portion 82 of the FEL portion 68. At block 212A, the first CPL portion 82 captures a second stage of data including shapes such as circles, rectangles, and triangles. At block 214A, the second stage of data is forwarded to the first sub-network 70. At block 216A, the first sub-network 70 performs the first task of object detection, classification, and localization for classes of objects found in the input image 61 and creates the detected object table.

At block 218A, a third stage of data 85 is captured within a second CPL portion 84. The third stage of data 85 defines complex geometries found in the input image 61. The complex geometries include combinations of the first stage of data 69 and the second stage of data, as well as complex feature combinations that form a representation of wheels, faces, and grids within the input image 61.

At block 220A, the second CPL portion 84 forwards the third stage of data 85 to the first sub-network 70 for performing the first task of object detection, classification, and localization for classes of objects in the input image 61. Thus, the third stage of data 85 augments and refines the detected object table.

At block 210B, the first stage of data 69 is received directly within the second CPL portion 84 of the FEL portion 68. At blocks 210B through 218B, the second sub-network 72 performs the second task of lane line 75 detection and creates the lane line location table. More specifically, at block 212B, the second CPL portion 84 receives the second stage of data capturing shapes including at least: lines, circles, rectangles, and triangles. At block 214B, the second CPL portion 84 forwards the second stage of data to the second sub-network 72 for performing the second task of lane line 75 detection and creates the lane line location table 87.

At block 216B, the third stage of data 85 is captured within the second CPL portion 84. The third stage of data 85 defines complex geometries including: combinations of the first and second stages of data, and complex feature combinations that are used to form a representation including lane lines 75. At block 218B, the second CPL portion 84 forwards the third stage of data 85 directly to the second sub-network 72, and at block 220B the second sub-network 72 performs the second task of lane line 75 detection and localization for classes of lane lines 75 in the input image 61, and to create the lane line location table 87.

At block 210C, the first stage of data 69 is received directly from the FEL portion 68 by the third sub-network 74. At blocks 210C-220C, the third sub-network 74 performs the third task of lane line 75 type detection to create the lane line type table 92. More specifically, at block 210C, the third CPL portion 86 captures the third stage of data 85. The third stage of data 85 defines complex geometries including: combinations of the first and second stages of data, and complex feature combinations that are used to form a representation including lane lines 75. At block 212C, the second CPL portion 84 forwards the third stage of data 85 to the third sub-network 74 where, at block 212C the third sub-network 74 performs the third task of lane line 75 type detection for classes of lane lines 75 in the input image 61, and for creating the detected lane line type table 92. In order to create the detected lane line type table 92, at block 214C the third sub-network 74 predicts at least ten values for each lane line 75 in the input image 61. At block 216C, the third sub-network 74 extracts values for each lane line 75 in the input image 61. At block 218C, the third sub-network 74 extracts a maximum value for each lane line 75, and at block 220C, the third sub-network 74 extracts a lane line 75 label corresponding to the maximum value for each lane line 75 found in the input image 61.

The method 200 takes the outputs of the detected object table 80 from block 220A, the lane line location table 87 from block 218B, and the lane line 75 labels in the detected lane line type table 92 from block 220C to train the first, second, and third sub-networks 70, 72, 74. More specifically, at block 222, the method 200 trains the first sub-network 70 by minimizing a loss function of the first sub-network 70 while freezing the second and third sub-networks 72, 74. Likewise, at block 224, the method 200 trains the second sub-network 72 by minimizing the loss function of the second sub-network 72 while freezing the first and third sub-networks 70, 74. Finally, at block 226, the method 200 trains the third sub-network 74 by minimizing the loss function of the third sub-network 74 while freezing the first and second sub-networks 70, 72. While in the foregoing, steps 210A-220A, 210B-218B, and 210C-220C appear sequentially, it should be appreciated that the "A", "B", and "C"-labeled steps may be performed concurrently or sequentially without departing from the scope or intent of the present disclosure. That is Steps 210B-218B may be performed before, after, or concurrently with steps 210A-220A and 210C-220C. Likewise, steps 210C-220C may be performed before, after, or concurrently with steps 210B-218B and before, after, or concurrently with steps 210A-220A. Similarly, steps 222-226 may be performed in the sequence described above, or the steps may be performed in any other order without departing from the scope or intent of the present disclosure. At block 228, the method 200 ends, whereupon the method 200 returns to block 202 to begin again. In some aspects, the method 200 runs continuously and recursively while the vehicle 12 is operating, however the method 200 may also be used to train the HCNN 66 only, and may therefore in other examples only run intermittently.

A system and method for predicting lane line 75 types with neural networks offers several advantages. These include the ability to utilize preexisting infrastructure to perform image analyses that overcome optical interference caused by weather, debris, and the like. Moreover, the system and method of the present disclosure can mimic and improve upon a human driver's ability to determine the positions and types of lane lines 75 on a road surface 96. The system and method further provide robust predictions of both lane lines 75 and lane types even when the road surface 96 is obscured by weather, debris, and the like.

The description of the present disclosure is merely exemplary in nature and variations that do not depart form the gist of the present disclosure are intended to be within the scope of the present disclosure. Such variations are not to be regarded as a departure from the spirit and scope of the present disclosure.

What is claimed is:

1. A method of predicting lane line types utilizing a heterogeneous convolutional neural network (HCNN), the method comprising:
   capturing an input image with one or more optical sensors disposed on a host member;
   passing the input image through the HCNN, the HCNN having at least three distinct sub-networks, the three distinct sub-networks:
      predicting object locations in the input image with a first sub-network;
      predicting lane line locations in the input image with a second sub-network; and predicting lane line types for each predicted lane line in the input image with a third sub-network, wherein passing the input image through the HCNN further comprises:
directly receiving the input image in a feature extraction layer (FEL) portion of the HCNN, the HCNN having multiple convolution, pooling and activation layers stacked together with each other;
conducting within the FEL portion a learning operation to learn to represent at least a first stage of data of the input image in a form including horizontal and vertical lines and simple blobs of colors, and outputting the first stage of data to at least: the first sub-network, the second sub-network, and the third sub-network;
directly receiving by the first sub-network the first stage of data from the FEL portion and performing a first task of object detection, classification, and localization for classes of objects in the input image to create a detected object table;
directly receiving by the second sub-network the first stage of data from the FEL portion and performing a second task of lane line detection to create a lane line location table; and
directly receiving by the third sub-network the first stage of data from the FEL portion and performing a third task of lane line type detection to create a lane line type table.

2. The method of claim 1 further comprising:
receiving the first stage of data within a first convolution and pooling (CPL) portion of the FEL;
receiving a second stage of data capturing shapes including at least circles, rectangles, and triangles; and
forwarding the second stage of data to the first sub-network for performing the first task of object detection, classification, and localization for classes of objects in the input image to create the detected object table.

3. The method of claim 2 further comprising:
capturing a third stage of data within a second CPL portion, the third stage of data defining complex geometries including combinations of the first stage of data and the second stage of data and complex feature combinations to form a representation including wheels, faces and grids; and
forwarding the third stage of data from the second CPL portion to the first sub-network for performing the first task of object detection, classification, and localization for classes of objects in the input image to augment the detected object table.

4. The method of claim 3 further comprising:
receiving the first stage of data within the second CPL portion of the FEL;
receiving the second stage of data capturing shapes including at least lines, circles, rectangles, and triangles; and
forwarding the second stage of data to the second sub-network for performing the second task of lane line detection and localization for classes of lane lines in the input image to create the lane line location table.

5. The method of claim 3 further comprising:
capturing the third stage of data within the second CPL portion, the third stage of data defining complex geometries including combinations of the first stage of data and the second stage of data and complex feature combinations to form a representation including lane lines; and forwarding the third stage of data from the second CPL portion to the second sub-network for performing the second task of lane line detection and localization for classes of lane lines in the input image to create the lane line location table.

6. The method of claim 3 further comprising:
receiving the first stage of data within a third CPL portion of the FEL;
receiving the second stage of data capturing shapes including at least lines circles, rectangles, and triangles; and
forwarding the second stage of data to a third sub-network for performing the third task of lane line type detection for classes of lane lines types in the input image to create a detected lane line type table.

7. The method of claim 6 further comprising:
capturing the third stage of data within the third CPL portion, the third stage of data defining complex geometries including combinations of the first stage of data and the second stage of data and complex feature combinations to form a representation including lane lines; and
forwarding the third stage of data from the second CPL portion to the third sub-network for performing the third task of lane line type detection for classes of lane lines types in the input image and creating a detected lane line type table.

8. The method of claim 7 wherein creating a detected lane line type table further comprises:
predicting ten values for each lane line in the input image;
extracting values for each lane line in the input image;
extracting a maximum value for each lane line; and
extracting a lane line label corresponding to the maximum value.

9. The method of claim 1 further comprising:
training the first sub-network by minimizing a loss function of the first sub-network while freezing the second sub-network and the third sub-network;
training the second sub-network by minimizing a loss function of the second sub-network while freezing the first sub-network and the third sub-network; and
training the third sub-network by minimizing a loss function of the third sub-network while freezing the first sub-network and the second sub-network.

10. A system for predicting lane line types utilizing a heterogeneous convolutional neural network (HCNN), the system comprising:
one or more optical sensors disposed on a host member, the one or more optical sensors capturing an input image; and
an HCNN having at least three distinct sub-networks, the three distinct sub-networks comprising:
a first sub-network predicting object locations in the input image;
a second sub-network predicting lane line locations in the input image; and
a third sub-network predicting lane line types for each predicted lane line in the input image, and
wherein the HCNN receives the input image and passes the input image through the three distinct sub-networks, wherein when the HCNN passes the input image through the three distinct sub-networks, the input image is directly received in a feature extraction layer (FEL) portion of the HCNN, the HCNN having multiple convolution, pooling and activation layers stacked together with each other;
the FEL portion conducts a learning operation to learn to represent at least a first stage of data of the input image in a form including horizontal and vertical lines and simple blobs of colors, and outputting the first stage of data to at least: the first sub-network, the second sub-network, and the third sub-network;

the first sub-network directly receives the data from the FEL portion and performs a first task of object detection, classification, and localization for classes of objects in the input image to create a detected object table;

the second sub-network directly receives the data from the FEL portion and performs a second task of lane line detection to create a lane line location table; and the third sub-network directly receives the data from the FEL portion and performs a third task of lane line type detection to create a lane line type table.

11. The system of claim 10 wherein the first stage of data is received within a first convolution and pooling (CPL) portion of the FEL;

a second stage of data capturing shapes including at least circles, rectangles, and triangles is received within a first CPL portion of the FEL; and the second stage of data is forwarded to the first sub-network, wherein the first sub-network performs the first task of object detection, classification, and localization for classes of objects in the input image to create the detected object table.

12. The system of claim 11 wherein a third stage of data is captured within a second CPL portion, the third stage of data defines complex geometries including combinations of the first stage of data and the second stage of data and complex feature combinations to form a representation including wheels, faces and grids; and the second CPL portion forwards the third stage of data to the first sub-network, wherein the first sub-network performs the first task of object detection, classification, and localization for classes of objects in the input image to augment the detected object table.

13. The system of claim 12 wherein the first stage of data is received within the second CPL portion of the FEL;

the second stage of data is received within the second CPL portion of the FEL, the second stage of data capturing shapes including at least lines, circles, rectangles, and triangles; and the second stage of data is forwarded to the second sub-network, wherein the second sub-network performs the second task of lane line detection and localization for classes of lane lines in the input image to create the lane line location table.

14. The system of claim 12 wherein the third stage of data is captured within the second CPL portion, the third stage of data defining complex geometries including combinations of the first stage of data and the second stage of data and complex feature combinations to form a representation including lane lines; and the third stage of data is forwarded from the second CPL portion to the second sub-network, wherein the second sub-network performs the second task of lane line detection and localization for classes of lane lines in the input image to create the lane line location table.

15. The system of claim 12 wherein the first stage of data is received within a third CPL portion of the FEL;

the second stage of data is received within the third CPL portion of the FEL, the second stage of data capturing shapes including at least lines circles, rectangles, and triangles; and the second stage of data is forwarded to a third sub-network, wherein the third sub-network performs the third task of lane line type detection for classes of lane lines types in the input image to create a detected lane line type table.

16. The system of claim 15 wherein the third stage of data is captured within the third CPL portion, the third stage of data defining complex geometries including combinations of the first stage of data and the second stage of data and complex feature combinations to form a representation including lane lines; and the third stage of data is forwarded from the third CPL portion to the third sub-network, wherein the third sub-network performs the third task of lane line type detection for classes of lane lines types in the input image and creating a detected lane line type table.

17. The system of claim 16 wherein the third CPL portion creates a detected lane line type table by:

predicting ten values for each lane line in the input image;
extracting values for each lane line in the input image;
extracting a maximum value for each lane line;
extracting a lane line label from the detected lane line type table corresponding to the maximum value;
training the first sub-network by minimizing a loss function of the first sub-network while freezing the second sub-network and the third sub-network;
training the second sub-network by minimizing a loss function of the second sub-network while freezing the first sub-network and the third sub-network; and
training the third sub-network by minimizing a loss function of the third sub-network while freezing the first sub-network and the second sub-network.

18. A method of predicting lane line types utilizing a heterogeneous convolutional neural network (HCNN), the method comprising:

capturing an input image with one or more optical sensors disposed on a host member;
passing the input image through four shared convolution and pooling convolutional layer portions (CPLs) within the HCNN, the HCNN having at least three distinct sub-networks; and
passing an output of the four shared convolutional layers through at least three fully connected layers within the HCNN;
training a first sub-network by minimizing a loss function of the first sub-network while freezing a second sub-network and a third sub-network;
training the second sub-network by minimizing a loss function of the second sub-network while freezing the first sub-network and the third sub-network; and
training the third sub-network by minimizing a loss function of the third sub-network while freezing the first sub-network and the second sub-network, and
wherein the first sub-network performs a first task of object detection, classification, and localization for classes of objects in the input image to create a detected object table, the second sub-network performs a second task of lane line detection and localization for classes of lane lines in the input image to create a lane line location table, and the third sub-network performs a third task of lane line type detection for classes of lane lines types in the input image and creates a detected lane line type table.

* * * * *